Patented June 21, 1932

1,864,152

UNITED STATES PATENT OFFICE

CARSON W. SIMMS, WILLIAM J. BANNISTER, AND LLOYD C. SWALLEN, OF TERRE HAUTE, INDIANA, ASSIGNORS TO COMMERCIAL SOLVENTS CORPORATION, OF TERRE HAUTE, INDIANA, A CORPORATION OF MARYLAND

NITROCELLULOSE PLASTICIZER AND PIGMENT GRINDING COMPOSITION

No Drawing. Original application filed February 9, 1928, Serial No. 253,211. Divided and this application filed February 10, 1930. Serial No. 427,421.

Our invention relates to certain improved plasticizing materials for use in the production of pigmented nitrocellulose compositions, and pertains more especially to compositions comprising tricresyl phosphate admixed with metal salts of half esters of phthalic acid. Such substances, we have now discovered, are far superior to ordinary plasticizers because of the superior pigment-wetting and pigment-grinding properties which they possess.

The grinding of pigments for incorporation in nitrocellulose lacquers or paints is ordinarily for the purpose of simply breaking down the agglomerates of pigment rather than for breaking down the pigment particles into still smaller subdivisions. The grinding simply breaks down the agglomerates so that the pigment particles may be wetted by the grinding medium and the latter absorbed to disperse the pigment to a smooth paste. When the pigment used in a nitrocellulose lacquer or a paint has not been thoroughly ground, examination of the agglomerated particles indicates extremely dry surfaces which may cause settling of the pigment or other undesirable effects in the finished surface. Most pigments resist the wetting of their surfaces by the grinding medium. The measure of this resistance, which is probably due to absorbed particles of air or gas on the pigment particles, is usually designated as the "oil absorption" number of the pigment.

In determining the "oil absorption" number of a pigment it is customary to proceed somewhat as follows: Twenty grams of the dry pigment are placed in a round bottom glass vessel having dimensions of say approximately 2½" diameter at the top, and 3½" deep. The liquid to be used as a grinding medium is then added to the pigment from a burette. After each small addition of liquid the pigment is well stirred with a spatula. When the pigment particles become wet with the liquid they tend to coalesce and form small lumps of paste which increase in size as the absorption of liquid increases. When all of the remaining dry pigment has been picked up and wet, the end point is reached. This is indicated by the paste lumps becoming much softer and easily spread with the spatula. It should be noted that the end point is usually well defined and easily determined within 0.1—0.2 c. c. of the liquid used as the titrating medium. Results are recorded as grams of liquid or "oil" required to just wet all of the particles of 100 grams of pigment.

The use of tricresyl phosphate as a nitrocellulose solvent and plasticizer is well known in the art, it having been used in large quantities for this purpose for a number of years past.

In Canadian Patent 260,927 of May 18, 1926, B. K. Brown and Charles Bogin have disclosed the use of certain "metal alkyl resins" as components of nitrocellulose lacquer adapted to partly or completely displace varnish gums. These "metal alkyl resins" are more properly describable as polyvalent metallic salts of alkyl half esters of phthalic acid. These compounds are prepared by reacting an aqueous solution of the sodium salt of an alkyl half ester of phthalic acid with an aqueous solution of a polyvalent metallic salt, whereupon, the desired compound is precipitated. For example, the sodium salt of the monobutyl ester of phthalic acid reacts with zinc chloride in accordance with the following equation:

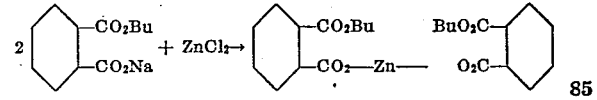

to form the zinc salt of the monobutyl ester of phthalic acid.

Salts of other polyvalent metals such as copper, lead, iron, manganese, nickel, cobalt, etc., give similar products. Other alkyl or aryl esters of phthalic acid may be employed. Altho there are naturally some exceptions to the general statement, these compounds may be generally characterized as solid, stable, neutral, resin-like substances, insoluble in water, soluble in organic solvents, and exerting a solvent action on nitrocellulose.

While both metal alkyl phthalates of the type described and tricresyl phosphate have been used in nitrocellulose lacquers for some time, we have now made surprising discovery that the addition of a metal alkyl or aryl phthalate to tricresyl phosphate produces a remarkable change in its physical properties and greatly enhances its value for the purpose of preparing pigmented nitrocellulose compositions. This new composition not only has a lower "oil absorption" number but also a pigment mixed with it has much greater fluidity than a similar composition to which a metal salt of an alkyl or aryl phthalate has not been added. Pigments mixed with tricresyl phosphate alone, form mixtures which are more plastic or putty-like and have little tendency to flow. Consequently, great difficulty is experienced in causing the mixture of pigment and grinding medium to flow thru the mill. The improvement obtained by the use of our improved plasticizer may be best illustrated by reference to the lacquer compounding process now used in the art.

It is generally recognized that tricresyl phosphate is a better plasticizer than castor oil and other oily materials. Part of this superiority is due to the fact that tricresyl phosphate, unlike the oils, is a solvent for nitrocellulose and hence is completely miscible with nitrocellulose compositions. Another point of superiority is the stable character of tricresyl phosphate. Despite the generally admitted superiority of tricresyl phosphate, above mentioned, castor oil has continued to be employed in the compounding of nitrocellulose lacquers, as a partial or complete substitute for true plasticizers, because of its superior properties in connection with the incorporation of pigments.

In the production of pigmented lacquers containing more than three pounds of pigment per gallon, the proper grinding of the pigment has been a difficult problem. For obvious reasons, the grinding of pigments in volatile, inflammable solvents or solvent-nitrocellulose mixtures has been impractical except by slow and expensive ball-mill grinding. At the same time, pigment grinding with true plasticizers as the wetting and dispersing agent has been difficult because of the large amounts of plasticizer required to produce a mixture with the proper degree of fluidity so that it will flow thru the mill. To impart the necessary fluidity to the pigment it has been necessary to use a greater proportion of plasticizer than is desirable in the finished lacquer and with some materials even an excess of the plasticizer has not produced the desired effect. For example, zinc oxide pigment and an amount of tricresyl phosphate slightly in excess of the "oil absorption" value, form a plastic-like mass which is very easily stirred with a spatula or paddle but which nevertheless is passed thru the grinding mill only with the greatest difficulty.

For the reasons which have just been enumerated, castor oil up to the present time has been very largely used for the grinding of lacquer pigments and has thus found its way into nitrocellulose lacquers where it is otherwise inherently undesirable because of its instability and poor plasticizing qualities.

We have now discovered that if a small quantity of a metal alkyl or aryl phthalate is dissolved or dispersed in tricresyl phosphate, the plasticizing properties of the latter are in no way disturbed and that at the same time, the mixture has pigment-grinding properties that are even more efficacious than those possessed by castor oil. The addition of the small quantity of metal alkyl or aryl phthalate to the pigment-grinding medium serves to decrease the "oil absorption" number of the latter to a point where it is comparable with that of castor oil. Table I shows the effect on the "oil absorption" number of pigment-grinding media obtained by the addition of 5% of zinc butyl phthalate to the latter. These values were obtained by following the method described above, using zinc oxide as the pigment. Similar results were also obtained when other pigments such as carbon black or chrome yellow were substituted for the zinc oxide.

Table I

| Pigment grinding media | Oil absorption number |
|---|---|
| Castor oil | 2.3 |
| Tricresyl phosphate | 4.6 |
| Tricresyl phosphate+5% zinc butyl phthalate | 3.6 |

We have found that in addition to lowering the "oil absorption" number of a pigment-grinding medium, the addition of such materials as metal alkyl or aryl phthalates appears to have other desirable effects not clearly shown by a determination of its "oil absorption" number. This is easily demonstrable by comparing two samples of a particular pigment, one of which has been mixed with castor oil and the other with our improved plasticizing and pigment-grinding composition. The former is a purely plastic body having no flow, while the latter is entirely viscous and has excellent flowing qualities.

In comparing the relative merits of different pigment-grinding media we have found it convenient to modify somewhat the usual test for determining the "oil absorption" number of a pigment. Table II shown below gives the results of a series of experiments made by weighing 10 grams of zinc oxide onto a glass plate. Three cubic centimeters of the medium to be tested was then worked into the pigment with a spatula. When the mixture being tested was thoroughly mixed with the pigment, the resultant mass was examined for its flowing qualities.

It was observed that generally the mixture of pigment and plasticizer took one of the following three forms:

1. Purely plastic body, having no flow and very little cohesion.
2. Semi-plastic body having a much lower yield point than #1 but possessing no flow. This form has a very high coefficient of cohesion and falls as a stringy mass when an attempt is made to pour it.
3. Purely viscous body having a zero yield point with a very high coefficient of cohesion. This material has excellent flowing qualities and falls from a spatula or container in the form of a very long, continuous stream.

The numbers used in the table below refer to the three forms which have just been described. In certain cases the form of the mixture did not lend itself to definite classification but was rather intermediate between two of the forms. In such cases, this form has been designated by the numbers 1½ or 2½.

Table II

| Nature of grinding medium | Nature of mass |
| --- | --- |
| Tricresyl phosphate | 1 |
| Castor oil | 2 |
| Tricresyl phosphate + 5% copper benzyl phthalate | 2½ |
| Tricresyl phosphate + 5% zinc butyl phthalate | 2½ |
| Tricresyl phosphate + 5% zinc methyl phthalate | 2½ |
| Tricresyl phosphate + 5% aluminium butyl phthalate | 2 |
| Tricresyl phosphate + 5% iron butyl phthalate | 1½ |
| Tricresyl phosphate + 5% copper butyl phthalate | 1½ |

Similar results have been obtained when using other pigments such as carbon black, titanox, lithopone, chrome yellow, etc. in place of zinc oxide.

We have found that the addition of approximately 5% of the particular metal salts of the half ester of phthalic acid gives optimum results. Increasing the amounts up to about 5% shows a marked improvement in the pigment-grinding properties of the medium; beyond We have found that the addition of approximately 5% of the particular metal salt of the half ester of phthalic acid gives optimum results. Increasing the amounts up to about 5% shows a marked improvement in the pigment-grinding properties of the medium, beyond this point there is obtained a slight but not very marked improvement by further additions.

This is a division of our co-pending application, U. S. Serial No. 233,211, filed February 9, 1928 for "nitrocellulose plasticizer and pigment grinding composition".

Now having described our invention, we claim:

1. A process which comprises grinding a pigment in the presence of tricresyl phosphate and a metal salt of a half ester of phthalic acid.
2. A process which comprises grinding a pigment in the presence of tricresyl phosphate containing about 5% of a metal salt of a half ester of phthalic acid dissolved or dispersed therein.
3. A process which comprises grinding a pigment in the presence of tricresyl phosphate and a metal salt of the butyl half ester of phthalic acid.
4. A process which comprises grinding a pigment in the presence of tricresyl phosphate containing about 5% of a metal salt of the butyl half ester of phthalic acid dissolved or dispersed therein.
5. A process which comprises grinding a pigment in the presence of tricresyl phosphate and zinc butyl phthalate.
6. A process which comprises grinding a pigment in the presence of tricresyl phosphate containing about 5% of zinc butyl phthalate dissolved or dispersed therein.
7. A pigment grinding medium which comprises tricresyl phosphate and a metal salt of a half ester of phthalic acid.
8. A pigment grinding medium which comprises tricresyl phosphate containing about 5% of a metal salt of a half ester of phthalic acid dissolved or dispersed therein.
9. A pigment grinding medium which comprises tricresyl phosphate and a metal salt of the butyl half ester of phthalic acid.
10. A pigment grinding medium which comprises tricresyl phosphate containing about 5% of a metal salt of the butyl half ester of phthalic acid dissolved or dispersed therein.
11. A pigment grinding medium which comprises tricresyl phosphate and zinc butyl phthalate.
12. A pigment grinding medium which comprises tricresyl phosphate containing about 5% of zinc butyl phthalate dissolved or dispersed therein.

In testimony whereof we affix our signatures.

LLOYD C. SWALLEN.
WILLIAM J. BANNISTER.
CARSON W. SIMMS.

CERTIFICATE OF CORRECTION.

Patent No. 1,864,152.  June 21, 1932.

CARSON W. SIMMS ET AL.

It is hereby certified that error appears in the printed specification of the above numbered patent requiring correction as follows: Page 3, line 57, for "No. 233,211" read No. 253,211; and that the said Letters Patent should be read with this correction therein that the same may conform to the record of the case in the Patent Office.

Signed and sealed this 1st day of November, A. D. 1932.

(Seal)

M. J. Moore,
Acting Commissioner of Patents.